United States Patent
Li

(10) Patent No.: US 11,966,451 B2
(45) Date of Patent: Apr. 23, 2024

(54) METHOD FOR OPTIMIZING DEEP LEARNING OPERATOR, DEVICE AND STORAGE MEDIUM

(71) Applicant: BEIJING XIAOMI PINECONE ELECTRONICS CO., LTD., Beijing (CN)

(72) Inventor: Bin Li, Beijing (CN)

(73) Assignee: BEIJING XIAOMI PINECONE ELECTRONICS CO., LTD., Beijing (CN)

(*) Notice: Subject to any disclaimer, the term of this patent is extended or adjusted under 35 U.S.C. 154(b) by 292 days.

(21) Appl. No.: 17/482,316

(22) Filed: Sep. 22, 2021

(65) Prior Publication Data

US 2022/0277170 A1 Sep. 1, 2022

(30) Foreign Application Priority Data

Feb. 26, 2021 (CN) .......................... 202110221205.2

(51) Int. Cl.
*G06F 18/21* (2023.01)
*G06N 3/04* (2023.01)
(Continued)

(52) U.S. Cl.
CPC ............... *G06F 18/21* (2023.01); *G06N 3/04* (2013.01); *G06T 1/60* (2013.01); *G06V 10/95* (2022.01)

(58) Field of Classification Search
CPC ............... G06F 18/21; G06F 2212/302; G06F 2212/454; G06F 2212/455; G06F 7/483; G06F 12/0897; G06F 9/5016; G06N 3/04; G06N 3/063; G06N 3/08; G06T 1/60; G06V 10/95; G06V 10/82; Y02D 10/00
See application file for complete search history.

(56) References Cited

U.S. PATENT DOCUMENTS 11,157,815 B2 * 10/2021 Howard ................... G06N 3/04
2022/0309320 A1 * 9/2022 Trusov ................. G06F 9/3887
(Continued)

FOREIGN PATENT DOCUMENTS

EP 4050523 A1 * 8/2022 ........... G06F 9/5016

OTHER PUBLICATIONS

European Patent Application No. 21199118.7 extended Search and Opinion dated Mar. 31, 2022, 9 pages.
(Continued)

*Primary Examiner* — Charles T Shedrick
(74) *Attorney, Agent, or Firm* — COZEN O'CONNOR

(57) ABSTRACT

A method for optimizing a deep learning operator, includes: calling a method of reading an image object to read target data from an L1 cache of an image processor to the processor in response to detecting the target data in the L1 cache, performing a secondary quantization operation on the target data in the processor to obtain an operation result and writing the operation result into a main memory of the image processor. The target data is fixed-point data obtained after performing a quantization operation on data to be quantized in advance and the data to be quantized is one of the following: float-point data of an initial network layer of the neural network model and fixed-point data outputted from a network layer previous to the current network layer.

9 Claims, 5 Drawing Sheets

(51) Int. Cl.
  *G06T 1/60*    (2006.01)
  *G06V 10/94*   (2022.01)

(56) References Cited

U.S. PATENT DOCUMENTS

2023/0259758 A1* 8/2023 Zhang .................... G06N 3/08
                                              706/25
2023/0306255 A1* 9/2023 Charlaix ................ G06N 3/08
                                              706/25

OTHER PUBLICATIONS

Han, Q. et al. "Extremely Low-bit Convolution Optimization for Quantized Neural Network on Modern Computer Architectures"; 49$^{th}$ International Conference on Parallel Processing; Aug. 17, 2020; 12 pages.

European Patent Application No. 21199118.7, Office Action dated Jan. 16, 2024, 18 pages.

Bruschi, N et al. "Enabling Mixed-Precision Quantized Neural Networks in Extreme-Edge Devices" arXiv.org, Cornell University Library, Jul. 15, 2020, 4 pages.

* cited by examiner

METHOD FOR OPTIMIZING DEEP LEARNING OPERATOR, DEVICE AND STORAGE MEDIUM

CROSS-REFERENCE TO RELATED APPLICATIONS

This application claims the benefit of priority to Chinese Application No. 202110221205.2, filed on Feb. 26, 2021, the contents of which are incorporated herein by reference in their entirety.

TECHNICAL FIELD

The present disclosure relates to a field of artificial neural networks, and more particularly to a method for optimizing a deep learning operator, a device and a storage medium.

BACKGROUND

With rapid development of artificial intelligence technology, a deep learning neural network achieved much success in tasks such as image classification, object detection, image segmentation, speech recognition, machine translating and other mode recognition. However, neural network that perform better at these types of tasks also typically use a larger scale of model parameters. This leads to a high computational complexity mainly calculated in terms of two aspects, i.e., spatial storage and time. Therefore, it is very important to quantize the neural network, especially for applications running on a terminal device or an embedded chip.

SUMMARY

According to a first aspect of embodiments of the disclosure, a method for optimizing a deep learning operator is provided. The method is applicable in a processor. The method includes: calling a method of reading an image object to read target data from an L1 cache of an image processor to the processor in response to detecting the target data in the L1 cache, in which the target data includes data to be inputted into a current network layer of a neural network model and the target data is fixed-point data obtained after performing a quantization operation on data to be quantized in advance, and the data to be quantized is float-point data of an initial network layer of the neural network model or fixed-point data outputted from a network layer previous to the current network layer; performing a secondary quantization operation on the target data in the processor to obtain an operation result and writing the operation result into a main memory of the image processor.

According to a second aspect of embodiments of the disclosure, an electronic device is provided. The device includes an image processor, a processor and a memory configured to store instructions executable by the processor. The processor is configured to: call a method of reading an image object to read target data from an L1 cache of an image processor to the processor in response to detecting the target data in the L1 cache, in which the target data includes data to be inputted into a current network layer of a neural network model and the target data is fixed-point data obtained after performing a quantization operation on data to be quantized in advance, and the data to be quantized is float-point data of an initial network layer of the neural network model or fixed-point data outputted from a network layer previous to the current network layer; perform a secondary quantization operation on the target data in the processor to obtain an operation result and write the operation result into a main memory of the image processor.

According to a third aspect of embodiments of the disclosure, a non-transitory computer readable storage medium having computer programs stored thereon is provided. The computer programs are executed by a processor to perform: calling a method of reading an image object to read target data from an L1 cache of an image processor to the processor in response to detecting the target data in the L1 cache, in which the target data includes data to be inputted into a current network layer of a neural network model and the target data is fixed-point data obtained after performing a quantization operation on data to be quantized in advance, and the data to be quantized is float-point data of an initial network layer of the neural network model or fixed-point data outputted from a network layer previous to the current network layer; performing a secondary quantization operation on the target data in the processor to obtain an operation result and writing the operation result into a main memory of the image processor.

It should be noted that, the details above and in the following are exemplary, and do not constitute a limitation of the present disclosure.

BRIEF DESCRIPTION OF THE DRAWINGS

The drawings herein are incorporated into the specification and constitute a part of the specification, show embodiments in conformity with embodiments of the present disclosure, and explain the principle of the present disclosure together with the specification.

DETAILED DESCRIPTION

The example embodiments will be described in detail here, and examples thereof are shown in the accompanying drawings. When the following descriptions refer to the accompanying drawings, unless otherwise indicated, the same numbers in different drawings represent the same or similar elements. The implementations described in the following example embodiments do not represent all the implementations consistent with the present disclosure. Rather, they are merely examples of the apparatus and method consistent with some aspects of the present disclosure as detailed in the appended claims.

Explanation of Terms

OpenCL (Open Computing Language) is the first open, royalty-free standard of general-purpose parallel programming for a heterogeneous system modern, a uniform programming environment, which facilitates writing of high-effective and easy code for high-performance computing servers, desktop computing systems, handheld devices by developers. It is widely used in multi-core processors (CPUs), graphics processors (GPU), Cell architectures, digital signal processors (DSPs) or other parallel processors.

Quantization for a neural network is a method for compressing a neural network model, which is used to compress a large scale neural network model to a small scale neural network model, such as conversion of a float-point algorithm of a neural network to a fixed-point algorithm.

An image object is a memory object defined in OpenCL, used to manage accessing of a global variable, a specific data memory management method supported by OpenCL, designed to be a non-transparent object, which may well support matrix computation and image operations. It is optimized via hardware and the requested memory may be not continuous.

A buffer object is a memory object defined in OpenCL, used to manage accessing of a global variable, similar to an array applied for by malloc in C language, which may store data objects in continuous memory.

In related art, the neural network on the terminal device may be accelerated by using a fixed-point quantization operation method. For example, in a case that the terminal device supports OpenCL (Open Computing Language), the OpenCL may be used to realize the fixed-point quantization operation of the neural network. In related art, a Buffer method is used to perform the fixed-point quantization operation. However, when performing the fixed-point quantization operation using the Buffer method, data is loaded from the L2 Cache (second-level cache) of a processor, which leads to a slow quantization speed and a poor performance of the deep learning framework for inferring the neural network model, and further increases system resource occupation and power consumption of the terminal device.

In order to solve the problems in the related art, embodiments of the disclosure provides a method and an apparatus for optimizing a deep learning operator, a device, and a storage medium, to overcome defects in the related art.

Figure 1:
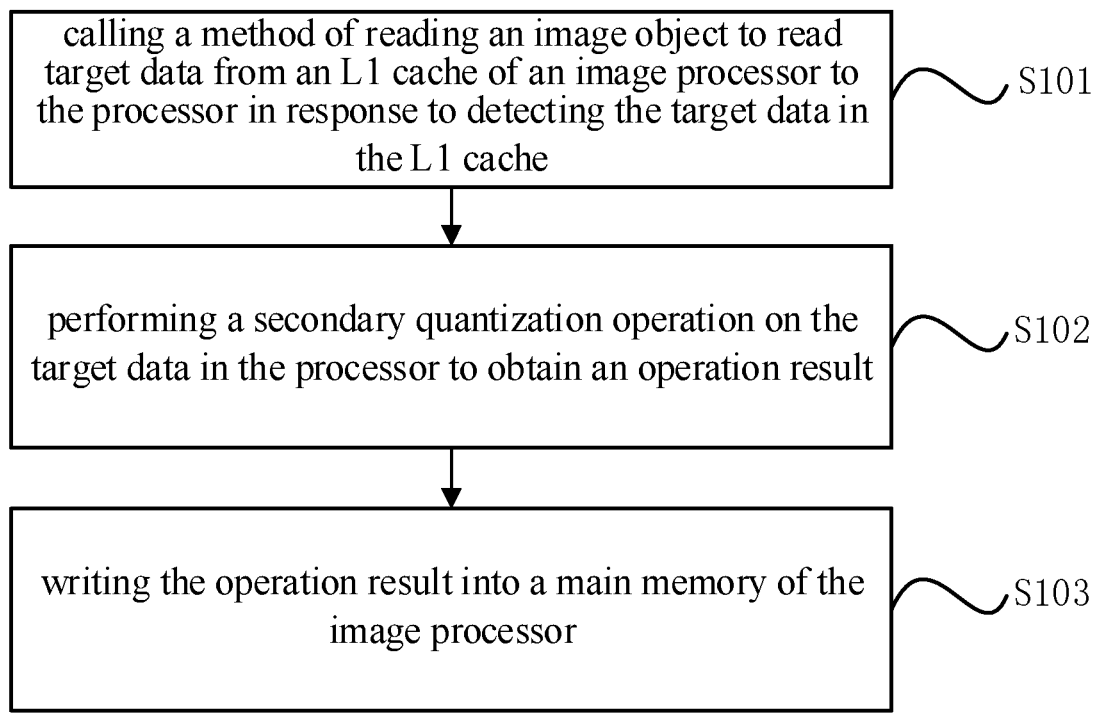
FIG. 1 is a flowchart illustrating a method for optimizing a deep learning operator based on OpenCL according to an embodiment of the present disclosure.

FIG. 1 is a flowchart illustrating a method for optimizing a deep learning operator based on OpenCL according to an embodiment of the present disclosure. The method may be performed by a processor of a terminal device (such as a smart phone, a tablet personal computer, a notebook computer or a wearable device or the like).

As illustrated in FIG. 1, the method may include the following blocks S101-S103.

At block S101, in response to detecting target data in an L1 cache of an image processor, a method of reading an image object is called to read the target data from the L1 cache to the processor.

The target data may include data to be inputted into a current network layer of a neural network mode. The target data may be fixed-point data obtained by performing a quantization operation on data to be quantized in advance. The data to be quantized may be float-point data of an initial network layer of the neural network model or fixed-point data outputted from a network layer previous to the current network layer. For example, 8-digit (or 16-digit) fixed-point data may be obtained by performing the quantization operation on the float-point data of the initial network layer of the neural network model. The fixed-point data of each network layer after the initial network layer may be 32-digit fixed-point data. 8-digit (or 16-digit) fixed-point data may be obtained by performing the quantization operation on the 32-digit fixed-point data.

In the embodiment, when the terminal device needs to quantize the current network layer of the neural network model, the terminal device may detect whether the target data exists in the L1 cache (the first-level high-speed cache) of the image processor, and call the method of reading the image object to read the target data from the L1 cache to the processor in response to detecting the target data in the L1 cache of the image processor.

For example, the processor of the terminal device may cache the target data in a form of the image object to the L1 cache, and when the neural network model needs to be quantized in the processor based on the target data, the target data can be read from the L1 cache to the processor for processing.

It should be understood that, since the L1 cache has an optimized acceleration mechanism, the speed of reading the target data from the L1 cache to the processor in the present embodiment may be many times faster than the speed of reading the target data from a main memory in the related art.

It should be noted that, a model number of the image processor may be set according to actual requirements, for example Adreno GPU, Mail GPU and so on, which is not limited herein.

At block S102, a secondary quantization operation is performed on the target data in the processor to obtain an operation result.

In the present disclosure, in response to detecting the target data in the L1 cache of the image processor, the method of reading the image object is called to read the target data from the L1 cache to the processor, and the secondary quantization operation is performed on the target data in the processor to obtain the operation result.

For example, after the method of reading the image object is called to read the target data from the L1 cache to the processor, a preset quantization method may be adopted to perform the secondary quantization operation on the target data in the processor to obtain the operation result.

It should be noted that, the preset quantization method may be set according actual requirements, which is not limited herein.

In another embodiment, the method of performing the secondary quantization operation on the target data in the processor may be described in the below embodiment with reference to FIG. 3, which is not elaborated here.

At block S103, the operation result is written into a main memory of the image processor.

In the embodiment, after performing the secondary quantization operation on the target data in the processor to obtain the operation result, the operation result may be written into the main memory of the image processor for use subsequently, for example used as target data required when quantizing a network layer following the current network layer.

For example, when the network layer following the current network layer needs to be quantized, the above operation result may be read from the main memory of the image processor to the L1 cache via an L2 cache (the second-level high-speed cache), and thereafter the operation result is directly read from the L1 cache for the quantization operation, such that the speed of reading data is improved.

It should be understood that, by writing the deep learning operator of the neural network model using a read-write method of the image object (i.e., the data processing implemented in blocks S101-S103), the hardware of the image processor may be used sufficiently to realize optimized acceleration of the image read-write method, further the speed of subsequently quantizing the neural network may be improved.

It can be obtained from the above description that, according to the method of the present embodiment, in response to detecting the target data in the L1 cache of the image processor, the method of reading the image object is called to read the target data from the L1 cache to the processor, the secondary quantization operation is performed on the target data in the processor to obtain the operation result, and the operation result is written into the main memory of the image processor. In this way, an optimized acceleration mechanism of the L1 cache of the image processor is utilized to improve the speed of reading the target data and further improve the speed of subsequently quantizing the neural network based on the read target data, such that an efficiency of interaction between the deep learning framework and the memory can be improved, and further an execution speed of the deep learning framework can be improved, system resource occupation of the terminal and power consumption of the terminal can be reduced.

Figure 2:
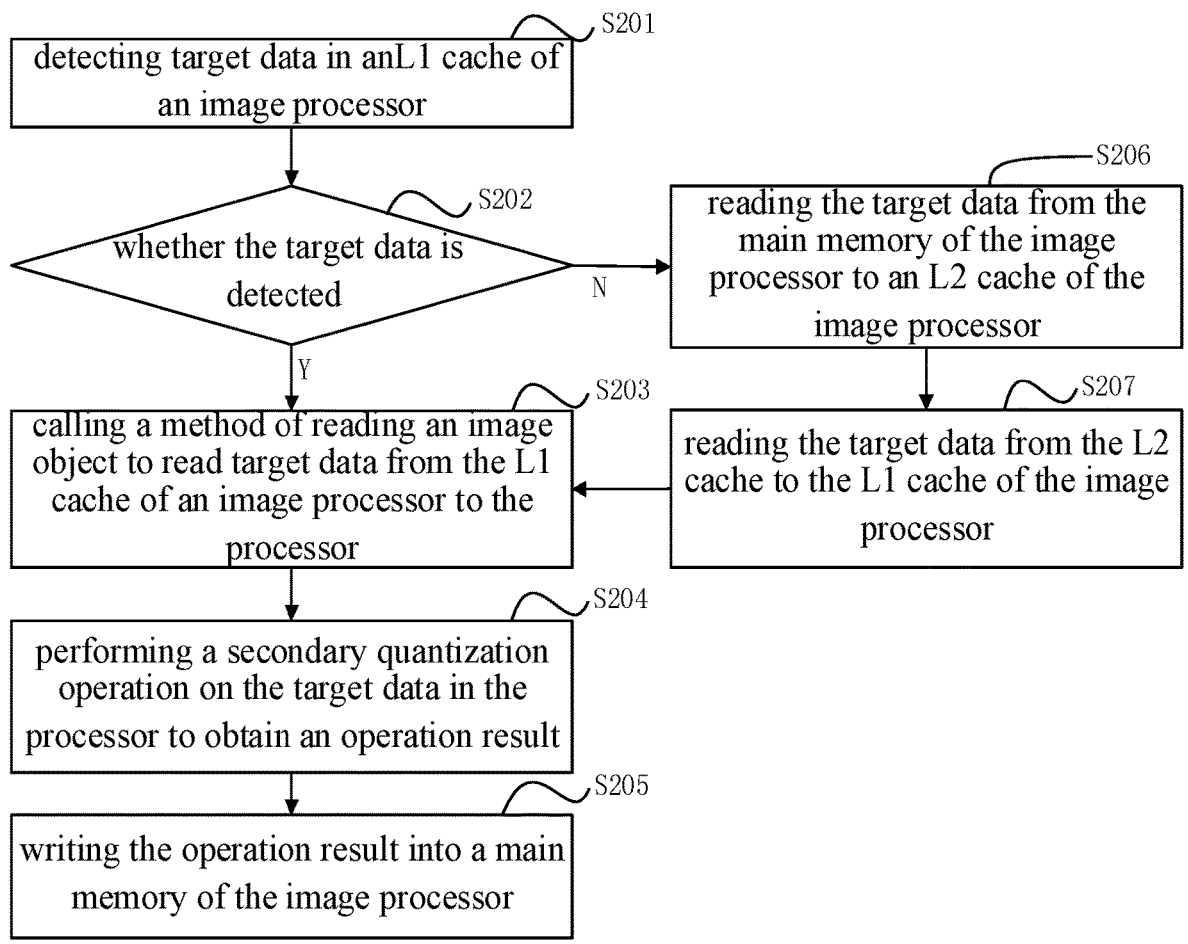
FIG. 2 is a flowchart illustrating a method for optimizing a deep learning operator based on OpenCL according to another embodiment of the present disclosure.

FIG. 2 is a flowchart illustrating a method for optimizing a deep learning operator based on OpenCL according to another embodiment of the present disclosure. The method may be performed by a processor of a terminal device (such as a smart phone, a tablet personal computer, a notebook computer or a wearable device or the like).

As illustrated in FIG. 2, the method may include the following blocks S201-S207.

At block S201, target data is detected in an L1 cache of an image processor.

The target data may include data to be inputted into a current network layer of a neural network mode. The target data may be fixed-point data obtained by performing a quantization operation on data to be quantized in advance. The data to be quantized may be float-point data of an initial network layer of the neural network model or fixed-point data outputted from a network layer previous to the current network layer.

At block S202, it is determined whether the target data is detected, if yes, block S203 is executed, if no, block S206 is executed.

At block S203, a method of reading an image object is called to read the target data from the L1 cache to the processor.

At block S204, a secondary quantization operation is performed on the target data in the processor to obtain an operation result.

At block S205, the operation result is written into a main memory of the image processor.

Regarding blocks S203-S205, reference may be made to the description and explanation of blocks S101-S103 with reference to FIG. 1, which are not elaborated here.

At block S206, the target data is read from the main memory of the image processor to an L2 cache of the image processor.

In the present embodiment, when the target data is not detected in the L1 cache of the image processor, the target data may be read from the main memory of the image processor to the L2 cache of the image processor.

For example, when the target data is not detected in the L1 cache, a preset method of reading memory data may be adopted to read the target data from the main memory of the image processor to the L2 cache of the image processor.

It should be noted that, the preset method of reading memory data may be selected from the related art based on actual requirements, which is not limited herein.

At block S207, the target data is read from the L2 cache to the L1 cache of the image processor.

In the present embodiment, after the target data is read from the main memory of the image processor to the L2 cache of the image processor, the target data may be read from the L2 cache to the L1 cache, such that subsequent blocks S203-S205 can be executed based on the target data in the L1 cache.

In an embodiment, a read_image function in OpenCL may be used to read the target data from the L2 cache to the L1 cache.

It should be noted that, a speed of reading data from the L1 cache is many times faster than a speed of reading data from either the L2 cache or the main memory, such that the fixed-point data is read using the read_image function in OpenCL via the L1 cache rather than the L2 cache or the main memory, and the speed of reading data is greatly improved, which is faster than a speed of calculating 8-digit fixed-point data based on the Buffer method.

It should be noted that, since the Buffer method in the related art may merely read data from the L2 cache using a vload function for fixed-point quantization operation, and the speed of reading data from the L1 cache is faster than the speed of reading data from the L2 cache, the method of reading the target data from the main memory of the image processor to the L2 cache of the image processor and then reading the target data from the L2 cache to the L1 cache of the image processor so as to read the target data from the L2 cache directly in the present embodiment make significant improvement in speed of reading data compared to the solution of using the Buffer method to perform the fixed-point quantization operation in the related art.

It can be obtained from the above description that, according to the present disclosure, the target data is read from the main memory of the image processor to the L1 cache of the image processor, and the target data may be directly obtained from the L1 cache of the image processor subsequently, such that an optimized acceleration mechanism of the L1 cache of the image processor may be utilized to improve the speed of reading the target data and further improve the speed of subsequently quantizing the neural network based on the read target data, and an efficiency of interaction between the deep learning framework and the memory can be improved.

Figure 3:
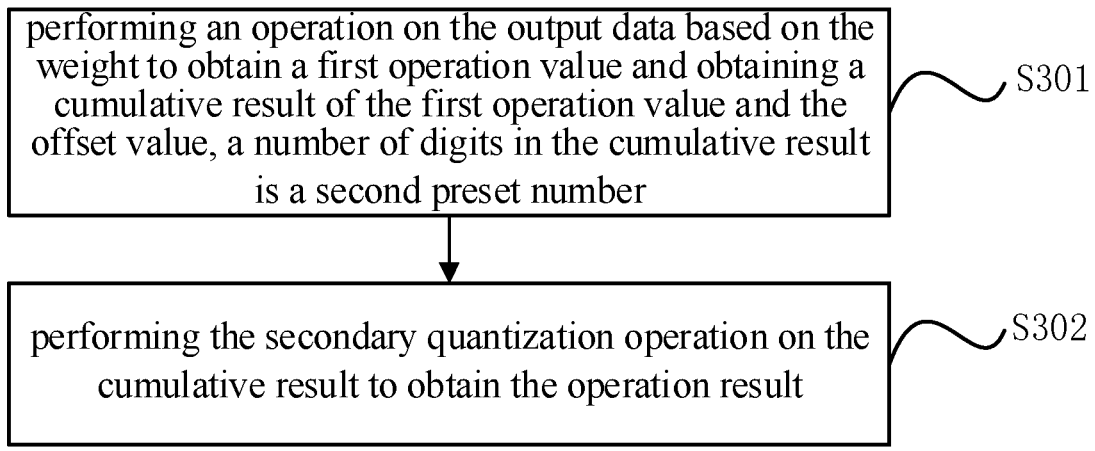
FIG. 3 is a flowchart illustrating how a processor performs a secondary quantization operation on target data according to an embodiment of the present disclosure.

FIG. 3 is a flowchart illustrating how to perform a secondary quantization operation on target data in a processor according to an embodiment of the present disclosure. The embodiment is described based on the foregoing embodiments by taking a method of performing the secondary quantization operation on the target data in the processor as an example.

In the embodiment, the number of digits in the fixed-point data is a first preset number. The first preset number may be 8 or 16. The target data may include a weight of the current network layer, an offset value, and output data outputted from the network layer previous to the current network layer.

As illustrated in FIG. 3, the above step of performing the secondary quantization operation on the target data in the processor to obtain the operation result in block S102 may include the following blocks S301-S302.

At block S301, an operation is performed on the output data based on the weight to obtain a first operation value and a cumulative result of the first operation value and the offset value is obtained.

The number of digits in the cumulative result may be a second preset number, for example 32.

In the embodiment, after the method of reading the image object is called to read the target data from the L1 cache to the processor, the weight of the current network layer of the neural network model, the offset value and output data from the network layer previous to the current network layer may be obtained, further the calculation may be performed on the output data from the previous network layer based on the weight, and the obtained operation result is added to the offset value to obtain the cumulative result.

For example, when the weight, the output data and the offset value are both 8-digit, the cumulative result may be quantized to become 32-digit, because an overflow problem may occur when performing the arithmetic operation by directly using 8-digit data. It should be noted that, since the 8-digit unsigned data may represent numbers from 0-255, if two unsigned data 200 and 100 are added, the cumulative result may be 200+100=300>255, which goes beyond a express range of the 8-digit data. In the embodiment, the cumulative result 300 is quantized to become 32-digit, such that the overflow problem may be avoided.

At block S302, the secondary quantization operation is performed on the cumulative result to obtain the operation result.

In the embodiment, after performing the operation on the output data based on the weight to obtain the first operation value and obtaining the cumulative result of the first operation value and the offset value, the secondary quantization operation can be performed on the cumulative result to obtain the operation result. The number of digits in the operation result is the first preset number.

For example, after performing the operation on the output data from the previous network layer based on the weight and adding with the offset value of the current network layer to obtain the cumulative result of the second preset number digits, the secondary quantization operation can be performed on the cumulative result to obtain the operation result of the first preset number digits. For example the 32-digit cumulative result is quantized to become the 8-digit operation result. In this way, the subsequent quantization for neural network can be performed based on the secondary quantized operation result.

It can be obtained from the above description that, according to the embodiment, the output data is subject to calculation based on the weight and added with the offset value to obtain the cumulative result of the second preset number digits, and the secondary quantization operation is performed on the cumulative result to obtain the operation result of the first preset number digits. In this way, the overflow problem in the data cumulative process can be avoided, and the subsequent quantization for neural network can be performed based on the secondary quantized operation result, such that the speed of quantizing the neural network may be improved and the system resource occupation of the terminal is reduced.

Figure 4:
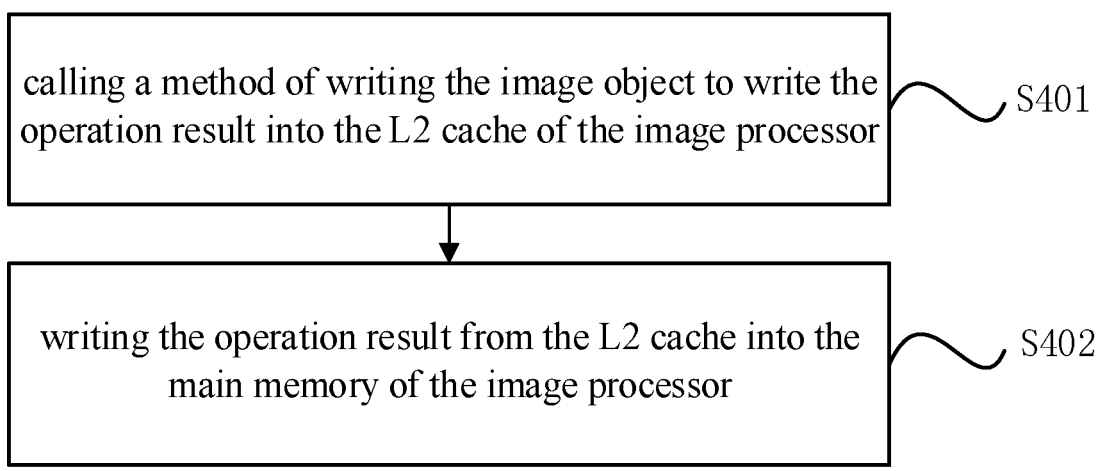
FIG. 4 is a flowchart illustrating how to write an operation result into a main memory of an image processor according to an embodiment of the present disclosure.

FIG. 4 is a flowchart illustrating how to write an operation result into a main memory of an image processor according to an embodiment of the present disclosure. The embodiment is described based on the foregoing embodiments by taking a method of writing the operation result into the main memory of the image processor as an example. As illustrated in FIG. 4, the step of writing the operation result into the main memory of the image processor in block S103 may include the following blocks S401-S402.

At block S401, a method of writing the image object is called to write the operation result into the L2 cache of the image processor.

In the embodiment, after performing the secondary quantization operation on the target data in the processor to obtain the operation result, the method of writing the image object may be called to write the operation result into the L2 cache of the image processor.

For example, after performing the secondary quantization operation on the target data in the processor to obtain the operation result, a write_image function in OpenCL may be used to write the operation result into the L2 cache of the image processor.

At block S402, the operation result is written from the L2 cache into the main memory of the image processor.

In the embodiment, after calling the method of writing the image object to write the operation result into the L2 cache of the image processor, the operation result may be written from the L2 cache into the main memory of the image processor.

For example, after calling the method of writing the image object to write the operation result into the L2 cache of the image processor, a preset write method of memory data may be used to write the operation result from the L2 cache into the main memory of the image processor.

It should be noted that, the preset write method of memory data may be selected from the related art according to actual requirements, which is not limited herein.

It can be obtained from the above description that, according to the embodiment, the method of writing the image object is called to write the operation result into the L2 cache of the image processor, and the operation result is written from the L2 cache into the main memory of the image processor, such that the operation result after the secondary quantization operation may be read into the main memory of the image processor, and subsequently the operation result may be read from the main memory of the image processor into the L1 cache as the target data for quantization of the next network layer of the current network layer.

Figure 5:
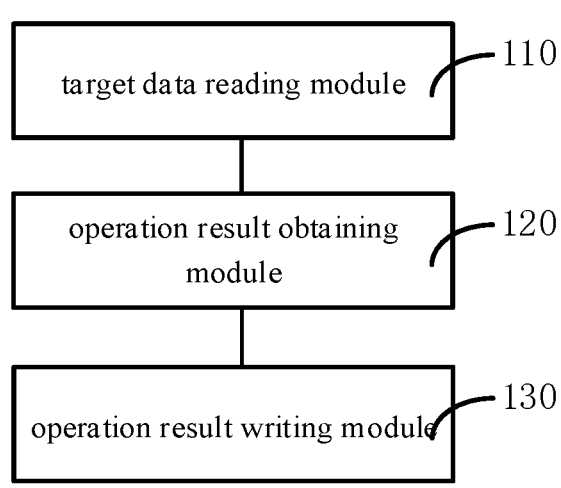
FIG. 5 is a block diagram illustrating an apparatus for quantizing a neural network according to an embodiment.

FIG. 5 is a block diagram illustrating an apparatus for quantizing a neural network according to an embodiment. The apparatus may be a processor of a terminal device (such as a smart phone, a tablet personal computer, a notebook computer or a wearable device or the like). As illustrated in FIG. 5, the apparatus includes a target data reading module 110, an operation result obtaining module 120 and an operation result writing module 130.

The target data reading module 110 is configured to call a method of reading an image object to read target data from an L1 cache of an image processor to the processor in response to detecting the target data in the L1 cache, in which the target data includes data to be inputted into a current network layer of a neural network model and the target data is fixed-point data obtained after performing a quantization operation on data to be quantized in advance, and the data to be quantized is float-point data of an initial network layer of the neural network model or fixed-point data outputted from a network layer previous to the current network layer.

The operation result obtaining module 120 is configured to perform a secondary quantization operation on the target data in the processor to obtain an operation result.

The operation result writing module 130 is configured to write the operation result into a main memory of the image processor.

It can be obtained from the above description that, in response to detecting the target data in the L1 cache of the image processor, the apparatus according to the embodiment calls the method of reading the image object to read the target data from the L1 cache to the processor, performs the secondary quantization operation on the target data in the processor to obtain the operation result, and writes the operation result into the main memory of the image processor. In this way, an optimized acceleration mechanism of the L1 cache of the image processor is utilized to improve a speed of reading the target data and further improve a speed of subsequently quantizing the neural network based on the read target data, such that an efficiency of interaction between the deep learning framework and the memory can be improved, and further an execution speed of the deep learning framework can be improved, system resource occupation of the terminal and power consumption of the terminal can be reduced.

Figure 6:
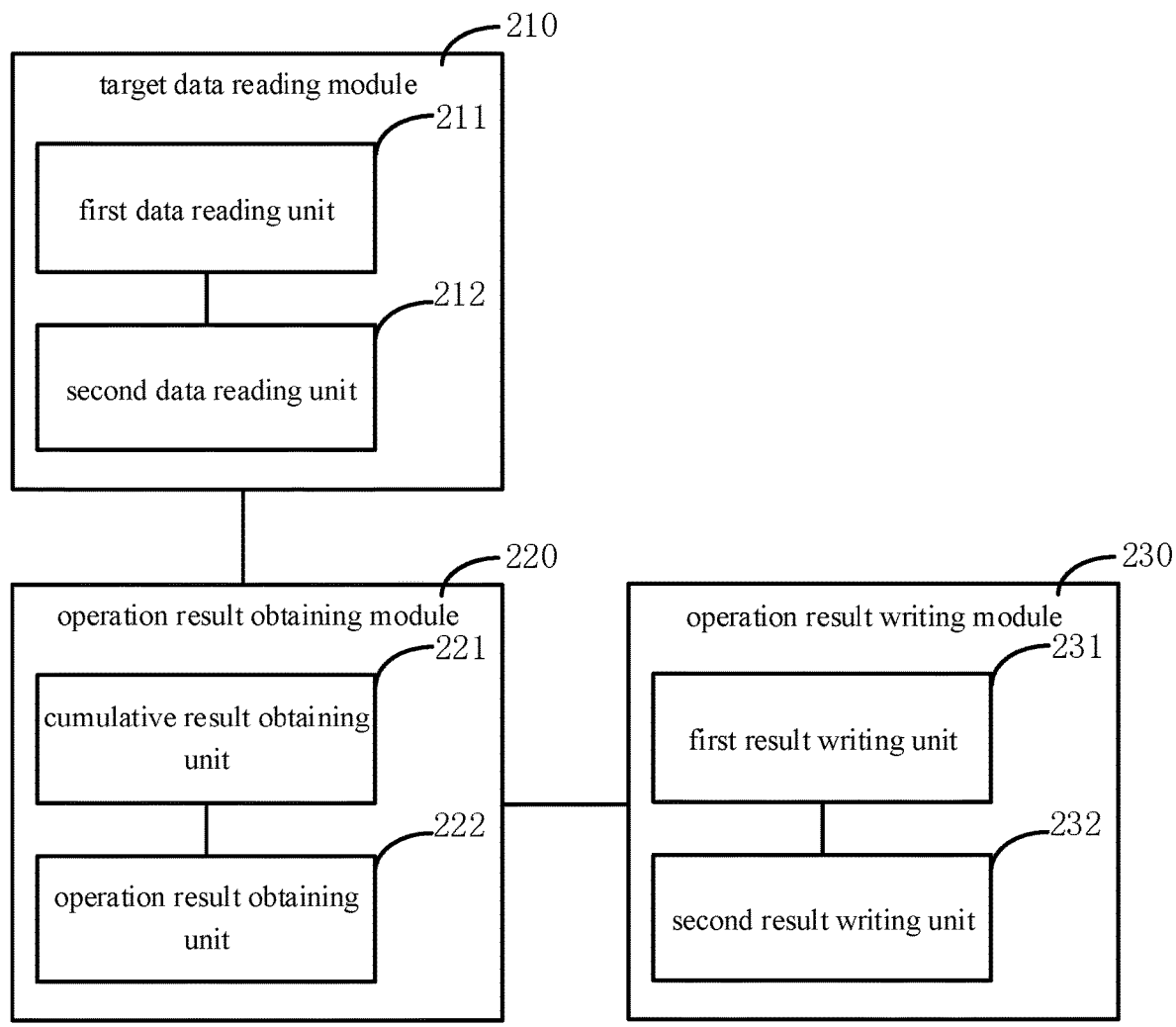
FIG. 6 is a block diagram illustrating an apparatus for quantizing a neural network according to another embodiment.

FIG. 6 is a block diagram illustrating an apparatus for quantizing a neural network according to another embodiment. The apparatus may be a processor of a terminal device (such as a smart phone, a tablet personal computer, a notebook computer or a wearable device or the like). The target data reading module 210, the operation result obtaining module 220 and the operation result writing module 230 in FIG. 6 have the same functionalities as the target data reading module 110, the operation result obtaining module 120 and the operation result writing module 130 described in the embodiment with reference to FIG. 5, which are not elaborated here.

As illustrated in FIG. 6, the target data reading module 210 may include a first data reading unit 211 and a second data reading unit 212.

The first data reading unit 211 is configured to read the target data from the main memory of the image processor to an L2 cache of the image processor in response to not detecting the target data in the L1 cache of the image processor.

The second data reading unit 212 is configured to read the target data from the L2 cache to the L1 cache of the image processor.

In an embodiment, the number of digits in the fixed-point data is a first preset number, the first preset number is 8 or 16. The target data includes a weight of the current network layer, an offset value, and output data outputted from the network layer previous to the current network layer.

The operation result obtaining module 220 may include a cumulative result obtaining unit 221 and an operation result obtaining unit 222.

The cumulative result obtaining unit 221 is configured to perform an operation on the output data based on the weight to obtain a first operation value and obtain a cumulative result of the first operation value and the offset value, in which a number of digits in the cumulative result is a second preset number, the second preset number is 32.

The operation result obtaining unit 222 is configured to perform the secondary quantization operation on the cumulative result to obtain the operation result, in which a number of digits of the operation result is the first preset number.

In an embodiment, the operation result writing module 230 may include a first result writing unit 231 and a second result writing unit 232.

The first result writing unit 231 is configured to call a method of writing the image object to write the operation result into the L2 cache of the image processor.

The second result writing unit 232 is configured to write the operation result from the L2 cache into the main memory of the image processor.

Regarding the apparatus in the above embodiments, the specific manner in which each module performs operation has been described in detail in the method embodiments, and detailed description are not given here.

Figure 7:
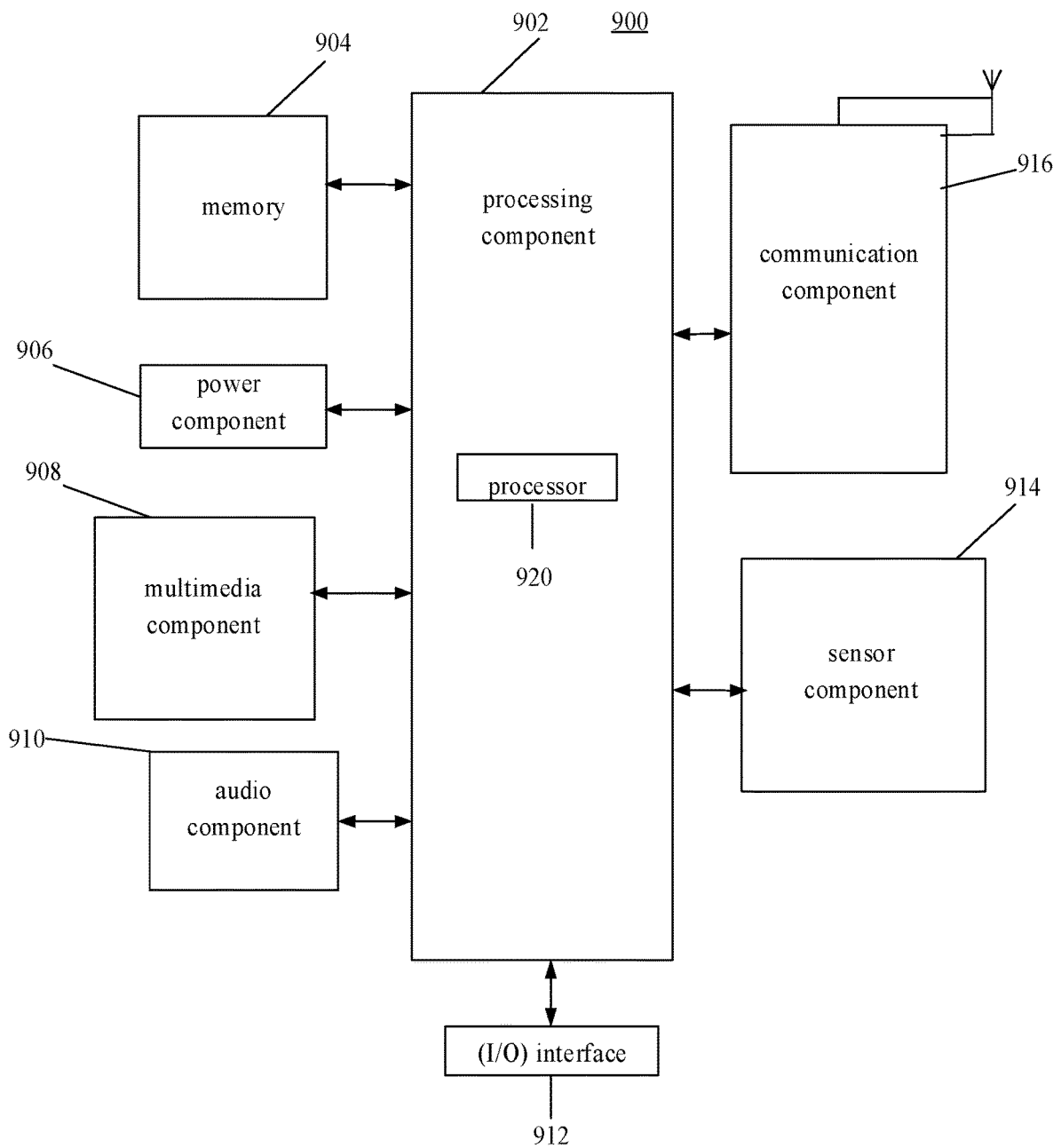
FIG. 7 is a block diagram illustrating an electronic device according to an embodiment.

FIG. 7 is a block diagram of an electronic device 900 according to an embodiment of the present disclosure. For example, the device 900 may be a mobile phone, a computer, a digital broadcasting terminal, a message transceiver device, a game console, a tablet device, a medical device, a fitness device and a personal digital assistant.

Referring to FIG. 7, the device 900 may include one or more of the following components: a processing component 902, a memory 904, a power component 906, a multimedia component 908, an audio component 910, an input/output (I/O) interface 912, a sensor component 914, and a communication component 916.

The processing component 902 typically controls overall operations of the device 900, such as the operations associated with display, telephone calls, data communications, camera operations, and recording operations. The processing component 902 may include one or more processors 920 to execute instructions to perform all or part of the steps in the above described methods. Moreover, the processing component 902 may include one or more modules which facilitate the interaction between the processing component 902 and other components. For instance, the processing component 902 may include a multimedia module to facilitate the interaction between the multimedia component 908 and the processing component 902.

The memory 904 is configured to store various types of data to support the operation of the device 900. Examples of such data include instructions for any applications or methods operated on the device 900, contact data, phonebook data, messages, pictures, video, etc. The memory 904 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 provides power to various components of the device 900. The power component 906 may include a power management system, one or more power sources, and any other components associated with the generation, management, and distribution of power in the device 900.

The multimedia component 908 includes a screen providing an output interface between the device 900 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 908 includes a front-facing camera and/or a rear-facing camera. When the device 900 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 910 is configured to output and/or input audio signals. For example, the audio component 910 includes a microphone (MIC) configured to receive an external audio signal when the device 900 is in an operation mode, such as a call mode, a recording mode, and a voice recognition mode. The received audio signal may be further stored in the memory 904 or transmitted via the communication component 916. In some embodiments, the audio component 910 further includes a speaker to output audio signals.

The I/O interface 912 provides an interface between the processing component 902 and peripheral interface modules, such as a keyboard, a click wheel, buttons, and the like. The buttons may include, but are not limited to, a home button, a volume button, a starting button, and a locking button.

The sensor component 914 includes one or more sensors to provide status assessments of various aspects of the device 900. For instance, the sensor component 914 may detect an open/closed status of the device 900, relative positioning of components, e.g., the display and the keypad, of the device 900, a change in position of the device 900 or a component of the device 900, a presence or absence of user contact with the device 900, an orientation or an acceleration/deceleration of the device 900, and a change in temperature of the device 900. The sensor component 914 may include a proximity sensor configured to detect the presence of nearby objects without any physical contact. The sensor component 914 may also include a light sensor, such as a CMOS or CCD image sensor, for use in imaging applications. In some embodiments, the sensor component 914 may also include an accelerometer sensor, a gyroscope sensor, a magnetic sensor, a pressure sensor, or a temperature sensor.

The communication component 916 is configured to facilitate communication, wired or wirelessly, between the device 900 and other devices. The device 900 can access a wireless network based on a communication standard, such as Wi-Fi, 2G, or 3G, or a combination thereof. In one embodiment, the communication component 916 receives a broadcast signal or broadcast associated information from an external broadcast management system via a broadcast channel. In one embodiment, the communication component 916 further includes a near field communication (NFC) module to facilitate short-range communications. For example, the NFC module may be implemented based on a radio frequency identity (RFID) technology, an infrared data association (IrDA) technology, an ultra-wideband (UWB) technology, a Bluetooth (BT) technology, and other technologies.

In some embodiments, the device 900 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is also provided a non-transitory computer readable storage medium including instructions, such as included in the memory 904, executable by the processor 920 in the device 900, for performing the above-described methods. For example, the non-transitory computer-readable storage medium may be a ROM, a RAM, a CD-ROM, a magnetic tape, a floppy disc, an optical data storage device, and the like.

Those skilled in the art easily think of other embodiments of the present disclosure after considering the description and practicing the disclosure disclosed herein. This disclosure is intended to cover any variations, uses, or adaptive changes that follow the general principles of this disclosure and include common general knowledge or customary technical means in the technical field not disclosed in this disclosure. The description and examples are to be considered exemplary only, and the true scope and spirit of this disclosure are disclosed by the claims.

It should be understood that the present disclosure is not limited to the precise structure that has been described above and shown in the drawings, and various modifications and changes can be made without departing from the scope thereof. The scope of the present disclosure is limited only by the appended claims.

What is claimed is:

1. A method for optimizing a deep learning operator, applicable in a processor, comprising:
    calling a method of reading an image object to read target data from an L1 cache of an image processor to the processor in response to detecting the target data in the L1 cache, wherein the target data comprises data to be inputted into a current network layer of a neural network model and the target data is fixed-point data obtained after performing a quantization operation on data to be quantized in advance, and the data to be quantized is one of: float-point data of an initial network layer of the neural network model and fixed-point data outputted from a network layer previous to the current network layer;
    performing a secondary quantization operation on the target data in the processor to obtain an operation result; and
    writing the operation result into a main memory of the image processor;
    wherein, a number of digits in the fixed-point data is a first preset number, wherein the first preset number is 8 or 16; the target data comprises a weight and an offset value of the current network layer, and output data outputted from the network layer previous to the current network layer;
    wherein performing the secondary quantization operation on the target data in the processor to obtain the operation result comprises:
    performing an operation on the output data based on the weight to obtain a first operation value and obtaining a cumulative result of the first operation value and the offset value, wherein a number of digits in the cumulative result is a second preset number, and the second preset number is 32; and
    performing the secondary quantization operation on the cumulative result to obtain the operation result, wherein a number of digits in the operation result is the first preset number.

2. The method of claim 1, further comprising:
    reading the target data from the main memory of the image processor to an L2 cache of the image processor in response to not detecting the target data in the L1 cache of the image processor; and
    reading the target data from the L2 cache to the L1 cache of the image processor.

3. The method of claim 1, wherein, writing the operation result into the main memory of the image processor comprises:
    calling a method of writing the image object to write the operation result into an L2 cache of the image processor; and writing the operation result from the L2 cache into the main memory of the image processor.

4. An electronic device, comprising:
an image processor, a processor, and a memory configured to store instructions executable by the processor;
wherein, the processor is configured to:
call a method of reading an image object to read target data from an L1 cache of an image processor to the processor in response to detecting the target data in the L1 cache, wherein the target data includes data to be inputted into a current network layer of a neural network model and the target data is fixed-point data obtained after performing a quantization operation on data to be quantized in advance, and the data to be quantized is one of: float-point data of an initial network layer of the neural network model and fixed-point data outputted from a network layer previous to the current network layer;
perform a secondary quantization operation on the target data in the processor to obtain an operation result; and
write the operation result into a main memory of the image processor;
wherein, a number of digits in the fixed-point data is a first preset number, wherein the first preset number is 8 or 16; the target data comprises a weight and an offset value of the current network layer, and output data outputted from the network layer previous to the current network layer;
wherein the processor is configured to perform the secondary quantization operation on the target data in the processor to obtain the operation result by:
performing an operation on the output data based on the weight to obtain a first operation value and obtaining a cumulative result of the first operation value and the offset value, wherein a number of digits in the cumulative result is a second preset number, and the second preset number is 32; and
performing the secondary quantization operation on the cumulative result to obtain the operation result, wherein a number of digits in the operation result is the first preset number.

5. The electronic device of claim 4, wherein, the processor is further configured to:
read the target data from the main memory of the image processor to an L2 cache of the image processor in response to not detecting the target data in the L1 cache of the image processor; and
read the target data from the L2 cache to the L1 cache of the image processor.

6. The electronic device of claim 4, wherein, the processor is configured to write the operation result into the main memory of the image processor by:
calling a method of writing the image object to write the operation result into an L2 cache of the image processor; and
writing the operation result from the L2 cache into the main memory of the image processor.

7. A non-transitory computer readable storage medium having computer programs stored thereon, wherein the computer programs are executed by a processor to perform:
calling a method of reading an image object to read target data from an L1 cache of an image processor to the processor in response to detecting the target data in the L1 cache, wherein the target data includes data to be inputted into a current network layer of a neural network model and the target data is fixed-point data obtained after performing a quantization operation on data to be quantized in advance, and the data to be quantized is one of: float-point data of an initial network layer of the neural network model and fixed-point data outputted from a network layer previous to the current network layer;
performing a secondary quantization operation on the target data in the processor to obtain an operation result; and
writing the operation result into a main memory of the image processor;
wherein, a number of digits in the fixed-point data is a first preset number, wherein the first preset number is 8 or 16; the target data comprises a weight and an offset value of the current network layer, and output data outputted from the network layer previous to the current network layer;
wherein performing the secondary quantization operation on the target data in the processor to obtain the operation result comprises:
performing an operation on the output data based on the weight to obtain a first operation value and obtaining a cumulative result of the first operation value and the offset value, wherein a number of digits in the cumulative result is a second preset number, and the second preset number is 32; and
performing the secondary quantization operation on the cumulative result to obtain the operation result, wherein a number of digits in the operation result is the first preset number.

8. The storage medium of claim 7, wherein the computer programs are executed by a processor to further perform:
reading the target data from the main memory of the image processor to an L2 cache of the image processor in response to not detecting the target data in the L1 cache of the image processor; and
reading the target data from the L2 cache to the L1 cache of the image processor.

9. The storage medium of claim 7, wherein, writing the operation result into the main memory of the image processor comprises:
calling a method of writing the image object to write the operation result into an L2 cache of the image processor; and
writing the operation result from the L2 cache into the main memory of the image processor.

* * * * *